July 29, 1958 W. E. DIETRICH, JR 2,845,572

ELECTRONIC CURVE TRACING DEVICE

Filed Sept. 17, 1954

INVENTOR.
WALLACE E. DIETRICH JR.
BY George Sipkin
B. L. Zangwill
ATTORNEYS

United States Patent Office 2,845,572
Patented July 29, 1958

2,845,572

ELECTRONIC CURVE TRACING DEVICE

Wallace E. Dietrich, Jr., Baltimore, Md.

Application September 17, 1954, Serial No. 456,889
11 Claims. (Cl. 315—10)
(Granted under Title 35, U. S. Code (1952), sec. 266)

The invention described herein may be manufactured and used by or for the Government of the United States of America for governmental purposes without the payment of any royalty thereon or therefor.

The present invention relates to an improved electrical function generator which is adapted to supply electrical inputs to a computer system. In the electronic analog computer art, such as, for example, represented by the applicant's copending application Serial No. 370,901, filed July 28, 1953, for Representation and Measurement of Physical Entities Electrically, it is often desired to supply a voltage varying with respect to time in a predetermined manner. Such a voltage may be representative of any desired input variable or function such as the ship hull outline form described in the above-identified application.

In the past various wave shaping circuits have been used to supply such input voltages but such circuits in general require manual manipulation and their operation is both time consuming and subject to human error. The circuitry required to produce odd waveforms may also become quite involved and the resultant system becomes complex and correspondingly expensive.

The present system is intended to generate a voltage representative of a function by tracing or following a drawing or plot of that function. The function to be traced is plotted upon a two dimensional sheet, an image thereof is projected on the face of a camera tube, and an electronic beam is caused to trace the image of the plotted outline. The deflection voltage applied to cause tracing of the image by the electron beam is a voltage which varies with respect to time in the same manner that the plotted function varies in one dimension with respect to the other.

An object of the present invention is to provide an automatic plot tracing function generator.

A further object of the invention is to provide an electronic curve tracer which automatically corrects itself upon faulty operation of the function generator.

A still further object of the invention is to produce a simple function generator capable of converting complex mathematical functions to representative electrical voltages.

Another object of the invention is the provision of a function generator which requires no adjustment or attention by the operator.

Other objects and many of the attendant advantages of this invention will be readily appreciated as the same becomes better understood by reference to the following detailed description when considered in connection with the accompanying drawings wherein.

Figure 1:
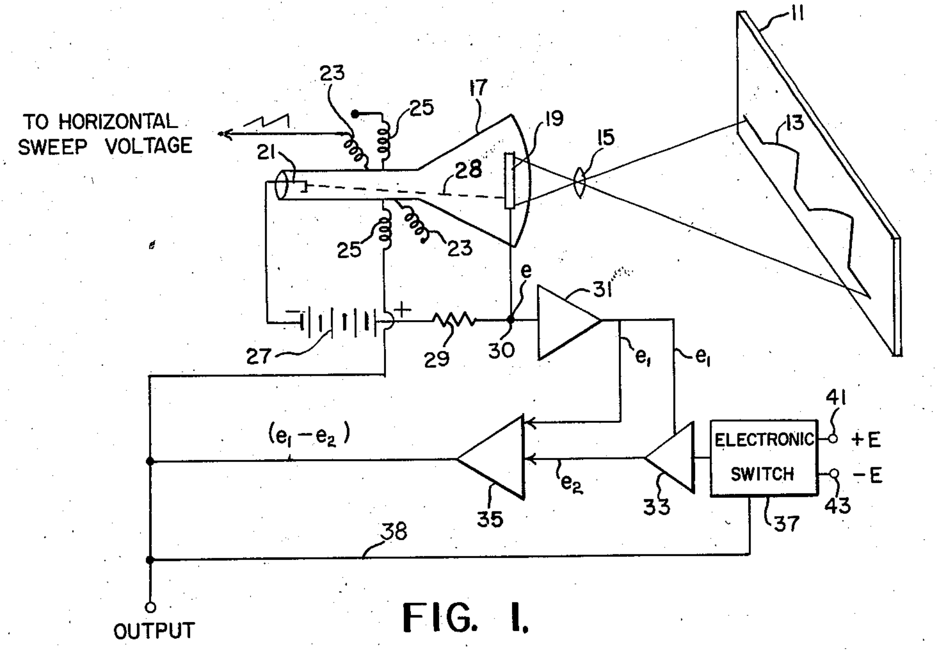
Figure 1 is a diagram, largely schematic in nature, of one embodiment of an apparatus constructed in accordance with the principles of the invention.

Referring to Figure 1 of the drawing, a complex mathematical function which is to be reproduced in terms of an electrical voltage is plotted upon a screen or panel 11. The screen or panel 11 may be made in the form of a transparent or translucent screen having an opaque plot line 13 thereon or it may take the form of a reflecting surface where the plot line 13 is non-reflecting.

Light transmitted through or reflected from the screen or panel 11 passes through an optical system indicated by a lens 15 so that an image of the plot is formed on the face of a camera tube such as a vidicon tube 17. The camera tube may be of any type well known in the art and is provided with a photo-conductive screen 19 and a cathode 21. Conventional structure of the tube such as the heater, focusing, and accelerating elements together with the circuits therefore have been omitted in order to simplify the drawing. These elements form no part of the present invention and, while necessarily present, are so well known to those skilled in the art that it is not deemed necessary to show them.

The camera tube 17 is equipped with appropriate beam deflecting means which may comprise electrostatic deflecting plates or electromagnetic coils. In the disclosed embodiment, tube 17 is equipped with horizontal deflection coils 23 and vertical deflection coils 25 to control the deflection of a cathode ray beam 28. The horizontal deflection coils 23 are energized from a source of horizontal sweep voltage (not shown) which may be any of the conventional saw-tooth generators well known in the art. The wave form of the sweep voltage is indicated above the input lead to these coils and the cathode ray beam is swept across the photo-conductive screen in a horizontal direction in a known manner under the influence of this voltage.

The vertical deflection coils are energized in a more complex manner by the circuit now to be described. As the beam is swept across the face of the tube in a horizontal direction under the action of the horizontal drive coils it will be apparent that the plot image on the face of tube 17 and hence on the photo-conductive screen 19 is scanned in a horizontal direction thereby. If now the beam is deflected in a vertical direction to follow the image of curve 13 superimposed on the photoconductive screen 19, the vertical deflection voltage necessary to accomplish this would at all times be a measure of the instantaneous height of the curve.

A circuit comprising a high voltage source, illustrated as a battery 27 and a resistor 29, is connected between the photoconductive screen 19 and the cathode 21 of the camera tube 17. The junction point 30 of the resistance 29 and the photoconductive screen 19 is connected through an isolating amplifier 31 to the input of a variable gain amplifier 33 and a subtracting amplifier 35. Amplifiers 31, 33 and 35 are all well known direct current amplifiers and are schematically shown as connected to one another by single lines representing connecting cables. The isolating amplifier 31 may for example be a conventional cathode follower amplifier. The variable gain amplifier 33 is a direct current amplifier whose gain modifies the input voltage received from the electronic switch 37 in accordance with the magnitude of the output voltage of isolating amplifier 31. The change in gain of the amplifier 33 is in inverse relation to the magnitude of the control voltage applied from amplifier 31. A large value of output voltage from the isolating amplifier reduces the gain of amplifier 33 and vice versa. Such amplifiers are well known in the art and the circuit details thereof form no part of the present invention.

Figure 3:
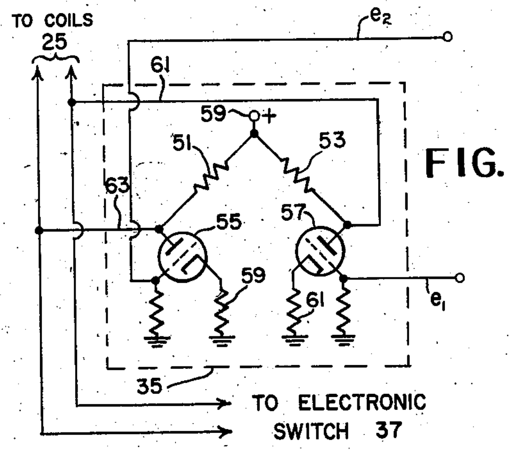
Figure 3 is a schematic view of one type of a subtracting amplifier which may be used in the system of Figure 1 and which is also used in the explanation of the operation of the system.

One form of subtracting amplifier circuit which may be used for subtracting amplifier 35 is shown in Figure 3. This circuit consists of a Wheatstone bridge circuit having a pair of resistance arms 51 and 53. The remaining arms of the bridge are made up of the electron discharge tubes 55 and 57. As shown in Figure 3 the voltage output of isolating amplifier 31 or $e_1$ is applied to the grid of the tube 57 and the output of the variable gain amplifier 33 or $e_2$ is applied to the grid of the tube 55. A source of energizing potential for the bridge is connected between a terminal 59 and ground. The junction points between the resistance arms and the electronic tube arms form the output terminals of the bridge and leads 61 and 63 are brought out from these junction points. The output of the bridge is connected as indicated to the deflection coils 25 of the camera tube and to the control input of the electronic switch or flip-flop circuit 37. The bridge output voltage also constitutes the output voltage of the system of Figure 1.

Returning now to the circuit of Figure 1, a pair of sources of primary deflecting voltages of equal magnitude but of opposite polarity, indicated as +E and −E, are connected respectively to the input terminals 41 and 43 of an electronic switch or flip-flop circuit 37. The output voltage of the amplifier 35 is applied to the vertical deflection coils 25 and also to the electronic switch 37 as a control voltage for the switch. The vertical deflection voltage or output voltage which causes the electron beam to follow the curve is also the output voltage of the entire system. This voltage varies as the instantaneous value of the plotted function in a manner which will be hereinafter set forth.

Figure 2:
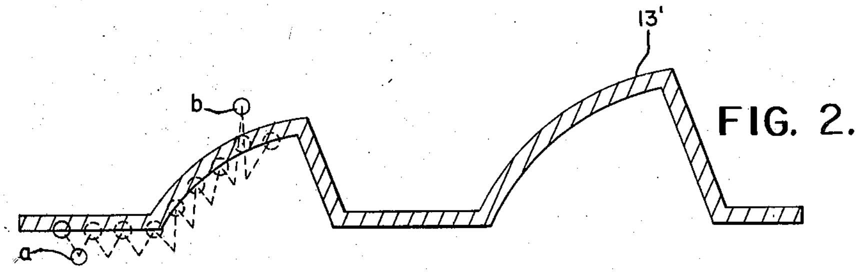
Figure 2 is a schematic view, representing the path of the electron beam on the face of the camera tube, used to explain the mode of operation of the system of Figure 1.

The operation of the system will now be described. Reference is now made to Figure 2 which is a schematic representation of the operation of the curve following action of the electron beam. The reference character 13' designates the image of the plot as it is superimposed on the photoconductive screen or face of the camera tube. The full line circle at *a* represents the electron beam in its initial position and the dotted lines and dotted circles represent the path and subsequent positions of the electron beam in following the plot image. The excursions of the beam have been purposely exaggerated to illustrate the operation of the system.

Assume that the system is placed in operation with the electron beam located at a point *a* on the brightly illuminated portion of the camera screen, and that the horizontal deflection voltage is at the start of its rise and thus tending to deflect the beam toward the right in Figure 2. The electron switch 37 is in its normal state, i. e., connecting the source +E through the switch to the input of the amplifier 33. The voltage +E passes through amplifiers 33 and 35 to the vertical deflection coils 25 and is of such polarity as to tend to deflect the electron beam upward.

At the starting point *a*, the electron beam is on the brightly illuminated face of the screen where the screen 19 is consequently highly conductive. A large current, therefore, flows from the source 27 through the resistance 29, screen 19 and the cathode ray beam to the cathode 21. The D. C. potential at point 30 is at a relatively low value due to the voltage drop through resistance 29. The point 30 is tied to the input of D. C. amplifier 31 and the amplifier produces an output voltage which is designated as $e_1$. This output voltage is first used to modify the voltage +E to obtain therefrom a voltage $e_2$ which is applied to the grid of tube 55 in the subtracting amplifier 35. Voltage $e_1$ is also directly applied to the grid of tube 57 in the subtracting amplifier.

With the beam at the point *a* where the photo-conductive material is brilliantly illuminated, the current through the camera tube is high and the voltage at point 30 is low due to the large voltage drop across resistor 29. Voltage $e_1$ is correspondingly low. Since $e_1$ is low, the gain of amplifier 33 is high and the magnitude of $e_2$ is correspondingly large. The bridge circuit is unbalanced with tube 55 conducting heavily and tube 57 only slightly conducting. It will be apparent that under these conditions output lead 63 is negative with respect to output lead 61. A convention will be adopted to describe this conditions of bridge output. The output is given in terms of the physical positions of the output leads as shown in Figure 3 and their relative polarities. Thus, the condition just described becomes in this notation (−+) indicating that the left hand output lead 63 is negative with respect to the right hand lead 61. A voltage (−+) when applied to the deflection coils 25 causes the beam to be deflected upwardly as indicated by the dotted line path in Figure 2. The beam also moves to the right under the influence of the horizontal sweep voltage applied to the horizontal deflection coils 23.

As the beam moves upward it comes onto the portion of the photo conductive screen 19 occupied by the dark image line 13'. The current through the camera tube drops with a consequent increase in magnitude of the voltage $e_1$. Voltage $e_1$ becomes larger than $e_2$ and the polarity of the bridge output terminals reverses and becomes (+−). This causes the beam to be deflected downward back toward the brightly illuminated portion of the screen below image line 13'. Voltage $e_1$ again decreases and $e_2$ increases to throw the beam upward toward line 13'. This process is repeated very rapidly with the result that the beam hunts to the bottom of the image line 13' as it is moved from left to right. The beam once having come into contact with the image line probably never actually leaves it, nor does the output voltage of amplifier 35 reverse in polarity. The beam hunts to or "rides" the bottom edge of the line riding partly in the dark portion and partly in the bright portion of the screen. The degree of hunt of the beam about the bottom edge of the dark image line may be set by adjusting the gain changing characteristics of the amplifier 33. At all times during the horizontal sweep the magnitude of the vertical deflection voltage is a close approximation of the instantaneous height of the curve.

It will be apparent that if the beam broke through or crossed the image line that the action of the deflection circuit would be ineffective to return the beam to the image line. In that case, voltage $e_1$ would be small and $e_2$ large causing an output voltage of polarity (−+) deflecting the beam upwardly. The electronic switch 37 is provided to care for this eventuality. Assume that the beam goes through the line, as at point *b* in Figure 2, as a result, perhaps, of a discontinuity in the image line or a sudden reversal in slope of the line. The beam is above the image line and is wholly on the brightly illuminated portion of the screen. The voltage $e_1$ approaches zero and $e_2$ is very high. The bridge output is (−+) and is very large. This voltage applied to the input of the electronic switch through line 38 is sufficient to actuate the switch to reverse the connections therethrough. The voltage −E from terminal 43 is now applied to the input of amplifier 33 and $e_2$ becomes a negative voltage. Voltage $e_1$ remains substantially zero and the output of the bridge reverses in polarity becoming (+−). This voltage deflects the beam downward. As the beam strikes the image line, $e_1$ becomes large again. Voltage $e_2$ still being negative, the bridge circuit unbalance becomes very large (+−) and the flip-flop circuit is again actuated to restore the connection of the voltage +E to the input of amplifier 33. At this point, the beam is within or partially contained in the image 13'. Voltage $e_2$ becomes positive again but $e_1$ is large and the polarity of the bridge output remains (+−) still tending to drive the beam downward. The system is now back in the condition where the beam will again hunt to the bottom of the image line 13'. The system thus automatically corrects itself upon the occurrence of faulty operation. It will be noted that upon completion of the horizontal sweep of the beam, the sweep voltage applied to the horizontal deflection coils 23 will return the beam to the left of screen 19 or to its original position in a manner well known in the art. Hence, the unit will continually retrace its original path until purposely stopped.

With respect to the gain control feature of the amplifier 33 it will be apparent that when the beam is on the image line 13', $e_1$ is large and the gain of the amplifier is decreased. As the beam tends to leave the image line and $e_1$ decreases, the gain of amplifier 33 is increased. The subtraction performed by the amplifier is $e_1-e_2$. When $e_1$ is large, $e_2$ is reduced in magnitude and $e_1-e_2$ is large. As $e_1$ decreases, $e_2$ is increased and the quantity $e_1-e_2$ becomes smaller. This feature sets the degree of hunt. When the beam hits the line, a large control voltage is produced to throw the beam down. As the beam partially leaves the line, $e_1$ diminishes and $e_2$ increases in magnitude tending to throw the beam toward the line again. The sensitivity of the system may be controlled by the amount of change in magnitude of $e_2$ with a change in $e_1$.

It will be apparent that in the operation of the system as described the voltage applied to the vertical deflection coil throughout a single cycle of the horizontal sweep voltage has a magnitude at each instant representative of the vertical height of the plot. This voltage therefore varies with respect to time in the same manner as the plotted function.

If desired a series of functions may be plotted. The plot of Figure 2 may represent, for example, a plot of one-half a ship's hull cross-section taken at two stations along the keel. Similarly, the hull cross-section at as many stations as desired may be plotted in the same manner so that the resultant voltage wave form obtained from the electronic tracer may be fed to a computer and operated on mathematically in the computer to obtain the desired results, such as hull displacement. The manner in which this is done is described in the above-mentioned copending application.

In accordance with the invention, the apparatus of Figure 1, as described above, constitutes a function generator which is capable of developing a voltage that varies with respect to time in the same manner that any given quantity varies with respect to another. Nearly any desired function which can be reduced to a two dimension plot may be used. The circuitry involved is the same for any function. No adjustment need be made when the input function is changed. All function plots used are subject to visual inspection for checking purposes and the possibility of error is thus substantially reduced. It will be apparent that any function, once plotted, can be used as many times as desired and exact duplication of results is readily attainable.

Obviously many modifications and variations of the present invention are possible in the light of the above teachings. It is therefore to be understood that within the scope of the appended claims the invention may be practiced otherwise than as specifically described.

What is claimed is:

1. An electronic plot tracing function generator comprising a cathode ray tube having a plurality of deflection elements and a photosensitive screen, means to apply a line image of a plot of the desired function on said photosensitive screen, means to apply a source of sweep voltage to one of said deflection elements to deflect the beam of said cathode ray tube in one direction, means adapted to apply a second source of voltage to another one of said deflection elements to deflect the beam of said cathode ray tube in a second direction, and means responsive to beam current flow in said cathode ray tube to alter the effective magnitude of the voltage from said second source applied to said other deflection element to cause said beam to follow said line image.

2. An electronic plot tracing function generator according to claim 1 wherein said means responsive to beam current flow comprises an electronic switch operative on the occurrence of extreme changes in beam current to reverse the polarity of the voltage applied from said second source to said other deflecting element.

3. A plot follower arrangement comprising a cathode ray tube having a photo-conductive screen element, a cathode and at least two deflection elements, means to project a light pattern including an image of the plot to be followed on said photo-conductive screen, a beam forming circuit connecting said cathode and said photo-conductive screen and including a dropping resistor and a pair of terminals adapted to be connected to a source of voltage, a sweep voltage generator connected to one of the deflection elements of said cathode ray tube, an electronic switch having a control circuit and input terminals adapted to be connected to sources of D. C. voltage of equal magnitude but of opposite polarity, an isolating amplifier having an input circuit connected to the said photo-conductive screen, a variable gain amplifier having a control circuit and an input circuit connected respectively to the output of the isolation amplifier and the output of said electronic switch, a subtracting amplifier having two input circuits connected respectively to the output of said isolation amplifier and the output of said variable gain amplifier, and means to connect the output circuit of said subtracting amplifier to the other of said deflecting elements and to the control circuit of said electronic switch.

4. A plot follower arrangement comprising an electron beam tube having a photo-sensitive electrode, at least one other electrode and a pair of deflecting elements, means defining a plot of a function, optical means to project a light image of said plot on said photo-sensitive electrode, a dropping resistor connected to said photo-sensitive electrode at a junction, means to connect a source of voltage between the dropping resistor and said other electrode, means to connect a source of sweep voltage to one of said pair of deflecting elements, a function voltage generator connected to the other of said deflecting elements, said generator comprising an electronic switch having a control input circuit and two input circuits for connection to opposite polarity D. C. voltage sources, a variable gain amplifier having an input circuit and a control circuit connected respectively to the output of said electronic switch and the junction of said resistor and the photo-sensitive screen, a subtracting amplifier having two inputs connected respectively to the output of said variable gain amplifier and the said junction, and connections between the output of the subtracting amplifier, the other deflection element and the control input circuit of said electronic switch.

5. A voltage magnitude responsive device comprising a first D. C. amplifier adapted to be connected to a source of voltage to be monitored, a D. C. variable gain amplifier jointly responsive to the output of said first D. C. amplifier and the voltage of an external source, and a D. C. subtracting amplifier jointly responsive to the output of said first D. C. amplifier and the output of said D. C. variable gain amplifier whereby the output of said D. C. subtracting amplifier undergoes a reversal in polarity upon large changes in the voltage level of the source of voltage to monitored.

6. A voltage magnitude responsive device according to claim 5 wherein a polarity reversing switching means connects the voltage of said external source to the input of said D. C. variable gain amplifier and is operated in response to reversal in polarity of the output of said D. C. subtracting amplifier.

7. An electrical function generator apparatus comprising an electron beam tube having a photo-conductive electrode, a cathode, and a pair of deflecting elements having their axes displaced at 90° with respect to one another, means defining a plot of the function to be generated, optical means to project a light image of said plot on said photo-conductive electrode, a voltage dropping resistor connected to said photo-conductive electrode, means to connect a source of voltage between said voltage dropping resistor and said cathode, means to connect a source of sweep voltage to one of said pair of deflecting elements, means generating a deflection voltage for said other one of said deflecting elements, said last named means comprising variable gain amplifier means jointly responsive to the potential of said photo-conductive screen and the voltage of an external source, subtracting means jointly responsive to the potential of said photo-conductive screen and the output of said variable gain amplifier means, and means to connect the output of said subtracting means to said other one of deflecting elements.

8. An electrical function generator apparatus according to claim 7, wherein the output of said subtracting means is connected to the control input of a polarity reversing switch connected between the external source of voltage and said variable gain amplifier means and which is responsive to the output polarity of said subtracting means.

9. In a curve following device including a camera tube, means for controlling the electron beam in said tube whereby it traces the curve image on said tube, said means comprising a reference source of voltage, means responsive to said reference voltage and the output voltage of said tube to produce a control voltage, means for taking the difference between said control voltage and the output of said tube and means responsive to said difference voltage for controlling the electron beam in said tube.

10. A device as recited in claim 9 including means responsive to said difference voltage for limiting the vertical sweep of said beam to the peak deviations of said curve image.

11. An apparatus for generating a function electrically comprising controlled means for developing a first voltage representing a point to point plot of said function, a source of reference voltage, variable amplifying means responsive to said first voltage and said reference voltage for developing a second voltage varying inversely with said first voltage, subtracting means for developing the voltage difference between said first voltage and said second voltage connected to said controlled means, the output of said subtracting means being indicative of a line plot of said function.

References Cited in the file of this patent

UNITED STATES PATENTS

| | | |
|---|---|---|
| 2,528,020 | Sunstein | Oct. 31, 1950 |
| 2,620,468 | Chireix | Dec. 2, 1952 |